UNITED STATES PATENT OFFICE.

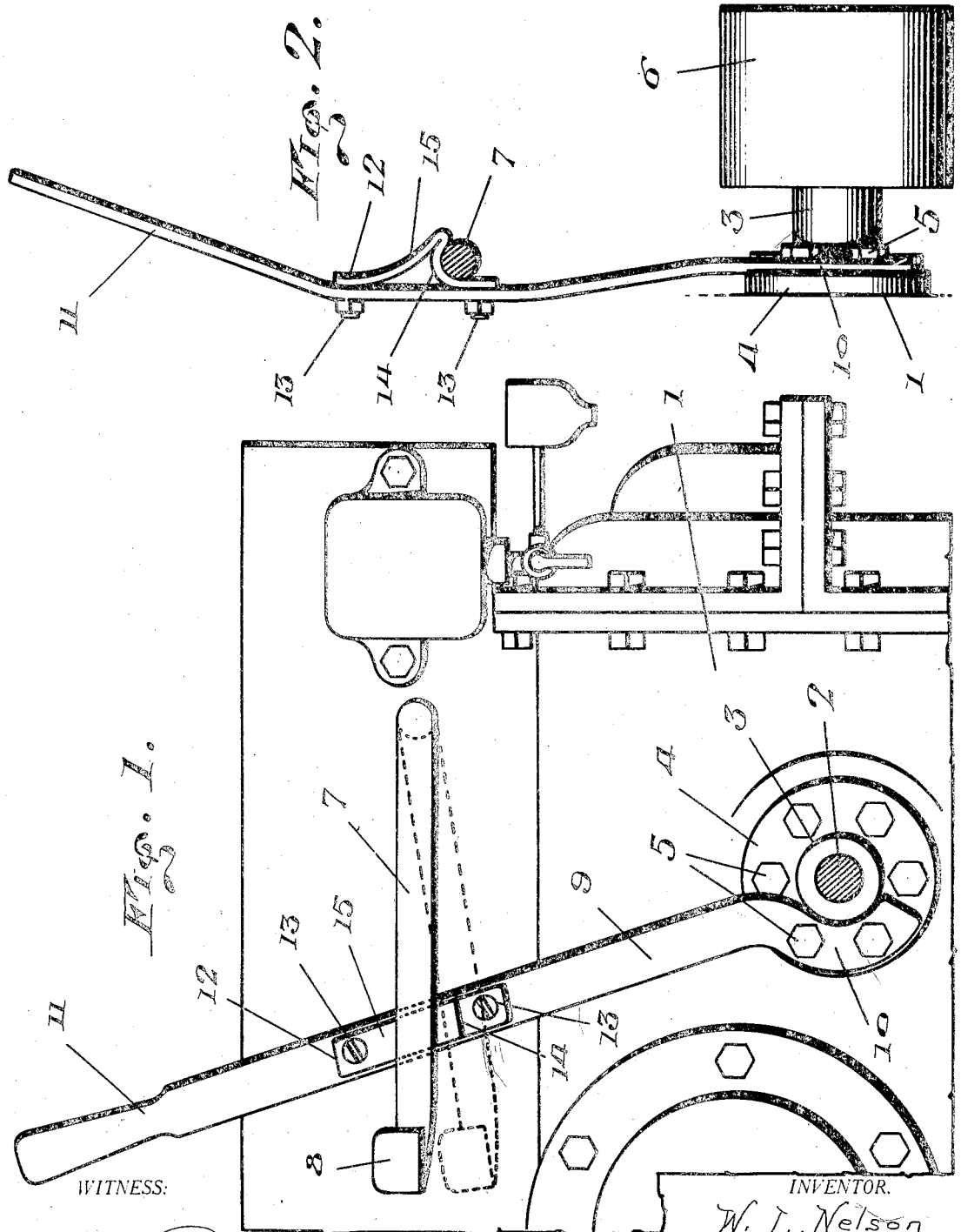

WALTER I. NELSON, OF GALVA, ILLINOIS.

CLUTCH-RELEASE CATCH.

1,378,714.　　　　　Specification of Letters Patent.　　Patented May 17, 1921.

Application filed October 20, 1919. Serial No. 331,788.

*To all whom it may concern:*

Be it known that I, WALTER I. NELSON, a citizen of the United States, residing at Galva, in the county of Henry and State of Illinois, have invented certain new and useful Improvements in Clutch - Release Catches; and I do hereby declare the following to be a full, clear, and exact description of the invention, such as will enable others skilled in the art to which it appertains to make and use the same.

The present invention has for its object the provision of a novel, yet simple and inexpensive device for attachment to a tractor or similar machine, for conveniently and effectively holding a foot or similar lever when depressed for operating a clutch or the like, the device being intended particularly for use on a tractor using a foot lever for opening the clutch between the engine and a belt pulley, whereby when the pulley is used for driving a belt, said clutch lever when depressed for opening the clutch, will be held in this position by the present device and which also enables the lever to be readily released so that the clutch will close.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a side elevation of the device as applied, and

Fig. 2 is an edge view thereof.

In the drawing there is illustrated a fragmentary portion of a typical tractor including the crank casing 1 through one side of which a shaft 2 extends, said shaft passing through a pulley bracket or bearing 3 having an annular flange 4 secured to the casing 1 by means of bolts 5. A belt pulley 6 is mounted on said shaft for driving a belt when the tractor is used as a power plant for operating a harvester or other machine. A foot lever 7 located above the shaft 2 has a foot piece 8 to be depressed by the foot for opening the clutch whereby the pulley 6 can be released from the engine in the usual manner, but it is necessary to hold this foot lever depressed in certain makes of tractors, which is objectionable under conditions when the clutch should be left open for a period of time.

The present device for attachment is for the purpose of holding the foot lever 7 depressed with the clutch open and the pulley 6 released from the engine, and in carrying out the invention there is provided an upwardly extending resilient bar or leaf spring 9, having its lower end portion offset and curved as at 10, to bear against the flange 4 at one side of the bracket or bearing 3 to be fastened in place by some of the bolts 5. This bar or spring 9 extends upwardly behind and across the lever 7, and is provided with a handle 11 at its upper end extending outwardly at an obtuse angle as seen in Fig. 2.

The bar 9 carries a member for engaging over the lever 7 when said lever is depressed and for this purpose, a strip 12 of metal has its ends secured to that side of the bar 9 adjacent to the lever 7 between the ends of said bar, by means of bolts 13 or the like. From the lower end of said strip, the strip is curved outwardly and downwardly to form a hook 14, and from the upper end of the strip it is curved outwardly to the end of the hook, to form a cam 15. This strip 12 contacts with the lever 7, and takes the wear, preventing the bar 7 from being worn by the movement of the lever 7, and the strip 12 can be removed and replaced when worn out.

The lever holding member or strip 12 of the bar 9 is so arranged, that when the lever 7 is depressed, it will by contact with the cam 15 spring the bar 9 away from the lever, and when the lever has moved past said cam, the bar 9 will spring back into place moving the hook 14 over the lever 7, so as to hold said lever down, as seen in Fig. 2. This will retain the clutch in open position with the pulley 6 free, whereby the belt can be stopped for a period of time, without manually holding the lever 7. By grasping the handle 11 and springing the bar 9 away from the lever 7, the hook 14 is removed from over the lever 7, thereby releasing said lever so that it can swing upwardly, to throw in the clutch for driving the pulley 6. Then, when the handle 11 is released, the bar 9 will spring back into place, bringing the cam 15 and hook 14 underneath the lever ready to engage it when the lever is again depressed.

Having thus described the invention, what is claimed as new is:—

A catch of the kind described comprising a resilient bar having means at one end for attaching it to a support, and a handle at its other end, and a strip having its ends secured to said bar between the ends thereof, said strip being bent from one end to form a hook and from the other end to form a cam extending to the end of the hook.

In testimony whereof I have signed my name to this specification in the presence of two subscribing witnesses.

WALTER I. NELSON.

Witnesses:
JAMES W. GALLOWAY,
DECIMA N. WEST.